Jan. 29, 1935.  F. R. WESTWOOD ET AL  1,989,221
COFFEE MEASURING AND DISPENSING DEVICE
Original Filed March 20, 1933  2 Sheets-Sheet 1
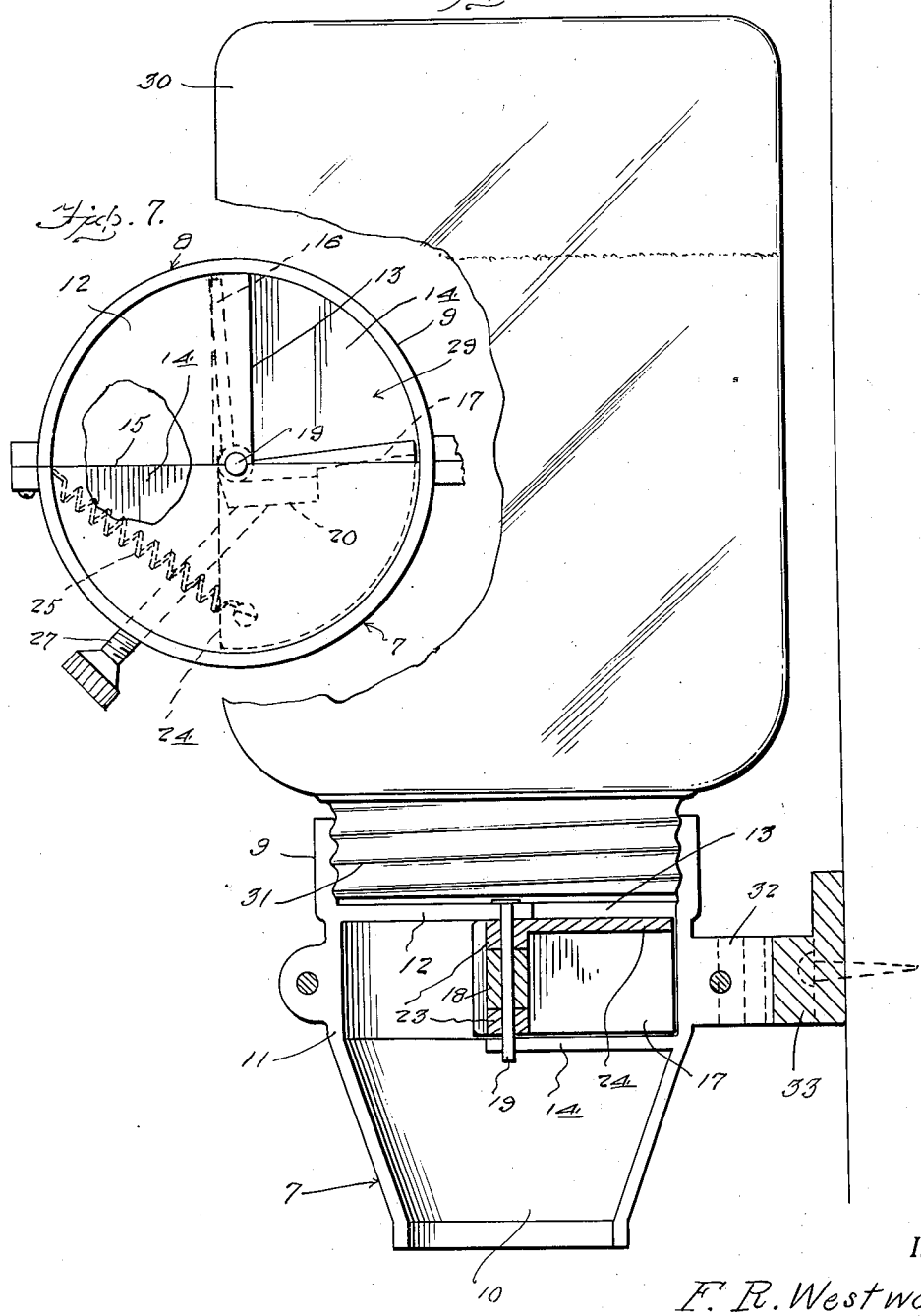
Inventors
F. R. Westwood
W. W. Landrum
By Clarence A. O'Brien
Attorney

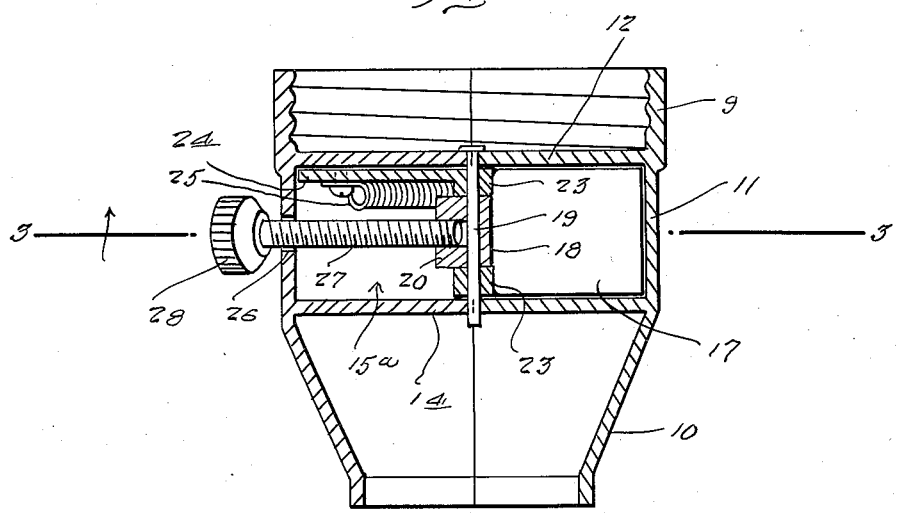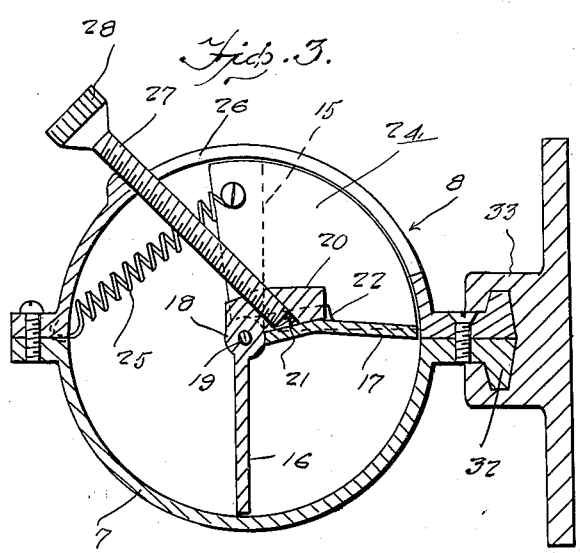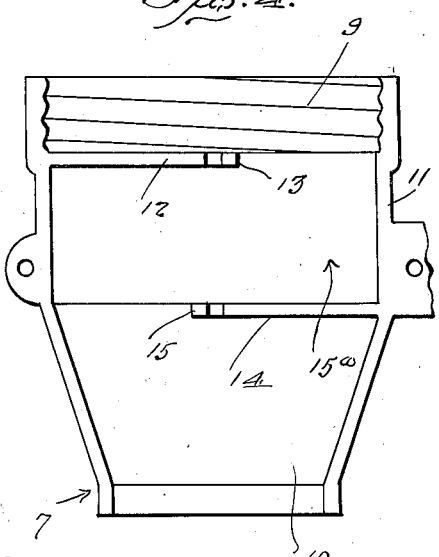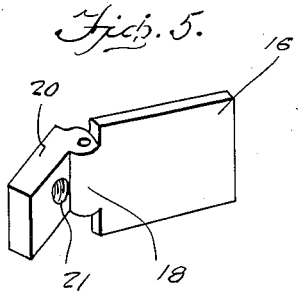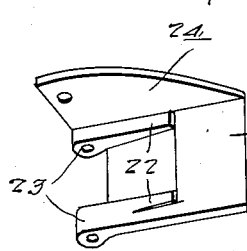

Patented Jan. 29, 1935

1,989,221

UNITED STATES PATENT OFFICE 1,989,221

COFFEE MEASURING AND DISPENSING DEVICE

Frank R. Westwood and William W. Landrum, Wichita, Kans.

Application March 20, 1933, Serial No. 661,845
Renewed June 29, 1934

1 Claim. (Cl. 221—109)

This invention relates to an improved device especially designed and constructed for expeditiously measuring and dispensing coffee or similar commodities in predetermined quantities.

Our primary aim is to provide a simple and economical device which may be used in the home or elsewhere to permit a predetermined charge or quantity of coffee to be discharged into a coffee receptacle or the like.

In perfecting the preferred embodiment of our invention we have devoted special consideration and thought to the adoption of an efficient and simplified device for home use which may be supported from a wall or suitable stationary support to accommodate an ordinary inverted glass jar from which the coffee is allowed to gravitate for measuring and dispensing.

Admittedly, the broad proposition is old in the art and the trade. Therefore, it is our particular aim to generally improve upon such known accessories by providing one characterized by an ingenious assembly of parts wherein the particular novelty is predicated upon a manually adjustable measuring valve unit.

Other features and advantages will become more readily apparent from the following description and drawings.

In the accompanying illustrative drawings wherein like numerals are employed to designate like parts throughout the same:

Figure 1 is an elevational view partly in section showing the complete assembled arrangement for accomplishing the desired results.

Figure 2 is a sectional view through the measuring and dispensing device per se.

Figure 3 is a horizontal section taken approximately on the plane of the line 3—3 of Figure 2 observing the structure in the direction of the arrow.

Figure 4 is an elevational view of one of the half sections of the device.

Figures 5 and 6 are detail perspective views of the essential features of the adjustable measuring valve unit.

Figure 7 is a top plan view with portions broken away disclosing the general assembly constituting the principal novelty of the invention.

For convenience of manufacture the device is in the form of a sectional casting of appropriate dimensions and shape and this may be described as comprising a pair of companion substantially duplicate half sections 7 and 8 bolted or otherwise separably connected together. Considered as a unit, this casting or casing embodies (see Figure 2) an internally screw-threaded attaching neck or rim 9, a conical discharge hopper 10, and an intervening annular connective web or portion 11.

The numeral 12 designates an upper disc-like partition formed with a segmental inlet opening 13.

Disposed in spaced parallelism below the first partition 12 is a second similarly constructed partition 14 provided with a discharge opening 15 emptying into the hopper 10. These openings 13 and 15 are located one-quarter turn apart as shown in Figure 7. These partitions 12 and 14 define a space between themselves as indicated at 15ª in Figure 2 which may be described as a mechanism accommodation chamber. Of course, the principal mechanism contained in this chamber is the special dispensing valve unit.

This unit, as shown in Figures 5 and 6, comprises a pair of complemental plates or leaves 16 and 17 of similar shape and proportion. The leaf 16 is provided at one end with a hinged knuckle 18 mounted for oscillation on the hinge pin 19 and adjacent this knuckle is an extension or lug 20 having a screw-threaded hole 21 permitting said lug to function in the capacity of a feed nut. This nut, as shown in Figure 3, is located between a pair of spaced parallel confining ribs 22 formed on the adjacent face of the plate 17. These ribs are apertured at one end as indicated at 23 to form additional hinge knuckles which straddle the first-named hinge knuckle 18 and are mounted for oscillation on the pin 19.

When in assembled relationship, these plates 16 and 17 (see Figure 3) normally occupy a position approximately ninety degrees apart though they are adjustable toward and from each other to vary this distance.

It is to be pointed out here that the intake opening 13 is normally uncovered or open. On the other hand however, the co-ordinated discharge opening 15 is normally closed and this is accomplished through the medium of a segmental shutter flange 24 formed integrally with and extending at right angles from the plate 17 as shown in Figure 6.

The shutter 24 is held in this position (see Figure 3) through the agency of a coil spring 25 attached thereto and anchored on the casting. The portion 11 of the section 8 is formed with a horizontal slot 26 through which an operating and feed screw 27 extends. The inner end of the screw is threaded into the nut 21 and the outer end extends through and beyond the slot and terminates in a suitably shaped finger knob or handle 28.

With the measuring and dispensing valve unit in the position shown in Figures 3 and 7, it will be observed, as shown in Figure 7, that the two plates 16 and 17 co-operate with the underlying partition 14 in forming a measuring pocket 29 and it is into this pocket that the coffee or other material is discharged. Then by grasping the knob 28 and moving the feed screw 27 longitudinally of the slot 26 in a direction against the tension of the spring it is evident that the coffee trapped in this pocket is literally swept into the discharge opening 15 and allowed to gravitate through the funnel-like hopper 10, into an appropriate collection receptacle (not shown).

It is evident also that as the measuring valve unit is thus swung to this discharging position the shutter flange 24 swings around beneath the opening 13 as shown in Figure 1 to close the opening at this time.

To illustrate the invention better I have shown an ordinary inverted mason jar 30 in Figure 1 having its discharge neck 31 secured in the attaching annulus or rim 9. Also I have shown the casting as provided with a suitable attaching bracket 32 detachably connected with a hanger fixture 33 in order to provide a convenient support for the entire assembly.

As before implied, the principal novelty resides in the especially designed casting formed with the partitions 12 and 14 having appropriately staggered intake and discharge openings 13 and 15 respectively, together with the special adjustable measuring and ejecting valve unit mounted for oscillation on the pin 19 between these partitions. Novelty is believed to reside in the two-part valve unit with the spring return means 25 for normally uncovering the opening 13 and simultaneously co-operating with the partition 14 in defining the measuring pocket 29.

Emphasis is placed on the arrangement wherein the capacity of this pocket 29 may be regulated at will by adjusting the plates 16 and 17 closer together or farther apart as desired. This is accomplished by threading the feed screw 27 into the nut 20 and swinging the plate 17 toward the plate 16.

Equal emphasis is placed on the arrangement wherein the nut 20 has the additional capacity of fitting between the stabilizing ribs 22 to afford the requisite degree of rigidity and proper relationship of the plates 16 and 17 to each other. Then too, the simplified arrangement whereby the feed screw 27 functions as the operating handle for the complete valve unit provides a double purpose for said feed screw.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

We claim:

A device of the class described comprising a hollow casing provided at its upper end with jar attaching means and at its lower end with a discharge hopper, upper and lower horizontally spaced parallel partitions mounted in said casing and provided with non-registering intake and discharge openings, a pivot pin attached to the central portion of said partitions, a pair of relatively adjustable plates including knuckles mounted for oscillation on said pin, the plates being disposed between said partitions, one of said plates being provided with an adjusting nut bearing against the adjacent hinged portion of the remaining plate, and a feed screw connected with said nut, together with a shutter carried by one of said plates and spring return means connected with said shutter.

FRANK R. WESTWOOD.
WILLIAM W. LANDRUM.